(12) United States Patent
Hanna

(10) Patent No.: US 12,054,187 B2
(45) Date of Patent: Aug. 6, 2024

(54) EXPANDABLE DOLLY

(71) Applicant: Daniel Hanna, Encino, CA (US)

(72) Inventor: Daniel Hanna, Encino, CA (US)

( * ) Notice: Subject to any disclaimer, the term of this patent is extended or adjusted under 35 U.S.C. 154(b) by 443 days.

(21) Appl. No.: 17/546,004

(22) Filed: Dec. 8, 2021

(65) Prior Publication Data

US 2023/0174131 A1  Jun. 8, 2023

(51) Int. Cl.
*B62B 5/00* (2006.01)
*B62B 3/06* (2006.01)

(52) U.S. Cl.
CPC .......... *B62B 5/0083* (2013.01); *B62B 3/0643* (2013.01); *B62B 2203/10* (2013.01)

(58) Field of Classification Search
CPC . B62B 5/0083; B62B 3/0643; B62B 2203/10; B62B 2205/006; B62B 2206/02; B62B 3/02; B62B 3/04; B62B 2203/60; B62B 2206/04
See application file for complete search history.

(56) References Cited

U.S. PATENT DOCUMENTS

| | | | | |
|---|---|---|---|---|
| 3,215,401 A | * | 11/1965 | Grabarski | B62B 3/0625 254/2 B |
| 4,166,638 A | * | 9/1979 | De Prado | B62D 21/14 280/638 |
| 4,854,803 A | * | 8/1989 | Coccaro | B60B 29/002 74/577 M |
| 5,441,378 A | * | 8/1995 | Puls | B60P 3/127 254/8 R |
| 5,660,518 A | * | 8/1997 | Meier | B62B 5/0083 180/41 |
| 5,660,637 A | * | 8/1997 | Dodge | B05B 13/0285 211/208 |
| 5,876,173 A | * | 3/1999 | English, Jr. | B60B 33/066 254/8 R |
| 5,957,649 A | * | 9/1999 | English, Jr | B60B 33/0049 254/8 R |

(Continued)

FOREIGN PATENT DOCUMENTS

| | | | | |
|---|---|---|---|---|
| CA | 2331038 A1 | * | 8/2001 | B62B 5/0083 |
| CA | 2408065 A1 | * | 4/2003 | B62B 5/0083 |

(Continued)

*Primary Examiner* — James A Shriver, II
*Assistant Examiner* — Ian Bryce Shelton
(74) *Attorney, Agent, or Firm* — Nolan Heimann LLP; Adam Diament

(57) ABSTRACT

A dolly that is expandable and capable of raising and transporting small or large objects is disclosed. The dolly includes a pair of frames facing each other. The dolly includes a platform positioned over each the frames. The dolly includes a bar receiving section extending from each of the frames. The bar receiving section includes a first hole at its distal end. The dolly includes an elongated bar comprising second holes. The dolly includes pins. The elongated bar inserts through the bar receiving sections such that the second holes align with the first holes in the bar receiving sections and adjust the distance between of the frames. The pins insert through the first holes and the second holes and lock the distance between of the frames. The platforms receive an object such as container, piano, packaging box, etc. for transportation.

12 Claims, 10 Drawing Sheets

(56) References Cited

U.S. PATENT DOCUMENTS

| | | | | |
|---|---|---|---|---|
| 6,206,386 B1* | 3/2001 | Briggs | B62B 3/02 | 414/447 |
| 6,311,992 B1* | 11/2001 | Theising | B62B 5/0083 | 414/458 |
| 6,382,643 B1* | 5/2002 | Baker | B62B 5/0083 | 280/47.11 |
| 6,533,524 B2* | 3/2003 | English, Jr | B60B 33/0005 | 254/8 R |
| 6,634,658 B2* | 10/2003 | Larouche | B62B 5/0083 | 414/458 |
| 6,669,213 B2* | 12/2003 | Woerner | B62B 3/002 | 280/47.35 |
| 6,715,979 B1* | 4/2004 | Theising | A47B 91/002 | 414/458 |
| 6,837,665 B2* | 1/2005 | English, Jr | B60B 33/0021 | 254/8 R |
| 7,097,406 B1* | 8/2006 | Gang | B60B 29/002 | 254/105 |
| 7,213,820 B2* | 5/2007 | Drummond | B60B 33/0005 | 280/79.11 |
| 8,794,899 B2* | 8/2014 | Cozza | B65G 7/04 | 414/458 |
| 8,910,957 B1* | 12/2014 | Hassell | B60P 3/122 | 254/108 |
| 9,004,507 B1* | 4/2015 | Nunley | B62B 1/26 | 280/47.331 |
| 9,120,495 B1* | 9/2015 | Anderson | B62B 3/04 | |
| 9,296,406 B2* | 3/2016 | Presley | B62B 3/02 | |
| 9,688,176 B2* | 6/2017 | Mason | B62B 5/0083 | |
| 9,845,125 B1* | 12/2017 | Liu | B62B 5/0083 | |
| 10,053,129 B1* | 8/2018 | Turner, Jr. | B62B 5/0083 | |
| 10,471,980 B1* | 11/2019 | Jordan | B62B 3/16 | |
| 10,543,862 B1* | 1/2020 | Aguirre | B62B 5/06 | |
| 10,752,052 B2* | 8/2020 | Sauer | B66F 9/18 | |
| 10,981,588 B1* | 4/2021 | Poudrier | B62B 3/02 | |
| 11,034,372 B1* | 6/2021 | Jordan | B62B 5/0003 | |
| 11,097,759 B1* | 8/2021 | Poudrier | B62B 3/008 | |
| 11,117,607 B1* | 9/2021 | Selzer | B62B 3/06 | |
| 2002/0113390 A1* | 8/2002 | Hallman | B62B 3/108 | 280/43 |
| 2003/0006586 A1* | 1/2003 | Comilla | B62B 3/002 | 280/651 |
| 2003/0030239 A1* | 2/2003 | Woerner | B62B 3/006 | 280/47.35 |
| 2003/0071426 A1* | 4/2003 | Larouche | B62B 5/0083 | 280/47.24 |
| 2003/0086777 A1* | 5/2003 | English, Jr. | B62B 5/049 | 414/495 |
| 2003/0091417 A1* | 5/2003 | Swann | B62B 5/0083 | 414/458 |
| 2004/0046345 A1* | 3/2004 | Bakhoum | B62B 5/0083 | 280/79.3 |
| 2004/0076501 A1* | 4/2004 | McGill | B66F 9/12 | 414/444 |
| 2004/0227316 A1* | 11/2004 | Drummond | B60B 33/0023 | 280/79.11 |
| 2004/0256819 A1* | 12/2004 | Sorensen | B25H 1/0007 | 280/79.11 |
| 2005/0132940 A1* | 6/2005 | Lin | B62B 5/0083 | 108/189 |
| 2006/0045683 A1* | 3/2006 | Huiming | B60B 29/002 | 414/426 |
| 2006/0091096 A1* | 5/2006 | Velez | B62B 3/102 | 211/60.1 |
| 2007/0235968 A1* | 10/2007 | Krizan | B62B 3/108 | 280/79.7 |
| 2008/0056871 A1* | 3/2008 | Morgan | B62B 3/0643 | 414/800 |
| 2009/0185885 A1* | 7/2009 | Cozza | B62B 5/0083 | 414/800 |
| 2010/0237577 A1* | 9/2010 | Bolster | B62B 3/0643 | 280/79.7 |
| 2014/0070506 A1* | 3/2014 | Sammons | B62B 3/02 | 29/428 |
| 2014/0145408 A1* | 5/2014 | Midas | B62B 3/104 | 280/47.131 |
| 2014/0312584 A1* | 10/2014 | Zhang | B62B 1/12 | 280/47.29 |
| 2015/0130340 A1* | 5/2015 | Presley | B62B 3/02 | 280/35 |
| 2015/0158408 A1* | 6/2015 | Mason | B62B 5/0086 | 414/495 |
| 2017/0101265 A1* | 4/2017 | Lilley | B66F 9/06 | |
| 2018/0222511 A1* | 8/2018 | Turner, Jr. | B62B 5/0083 | |
| 2019/0308861 A1* | 10/2019 | Reagle | B66C 23/48 | |
| 2020/0189316 A1* | 6/2020 | Sauer | B62B 3/104 | |
| 2020/0262461 A1* | 8/2020 | Turner, Jr. | B62B 3/008 | |
| 2021/0331730 A1* | 10/2021 | Nooner | B62B 5/02 | |
| 2022/0185403 A1* | 6/2022 | Listro | B63C 13/00 | |
| 2022/0371637 A1* | 11/2022 | Wallace | B62B 1/14 | |
| 2023/0174128 A1* | 6/2023 | Laudani | B62B 3/02 | 280/651 |

FOREIGN PATENT DOCUMENTS

| | | | | |
|---|---|---|---|---|
| CA | 2467301 A1 | * | 11/2004 | B60B 33/0005 |
| CA | 3116381 A1 | * | 10/2021 | A63C 17/06 |
| CN | 109080679 A | * | 12/2018 | B62B 3/02 |
| DE | 102011012615 A1 | * | 8/2012 | B62B 3/0618 |
| EP | 0317044 A2 | * | 5/1989 | |
| EP | 2796404 A1 | * | 10/2014 | B62B 1/008 |
| EP | 3912885 A1 | * | 11/2021 | B62B 3/02 |
| KR | 101913156 B1 | * | 10/2018 | |
| KR | 20200030956 A | * | 3/2020 | |
| KR | 102225987 B1 | * | 3/2021 | |
| WO | WO-9626097 A1 | * | 8/1996 | B62B 5/0083 |
| WO | WO-0176929 A1 | * | 1/2001 | B62B 5/0083 |
| WO | WO-2013021329 A1 | * | 2/2013 | B62B 3/02 |
| WO | WO-2015089138 A1 | * | 6/2015 | B60P 1/02 |
| WO | WO-2017036963 A1 | * | 3/2017 | B62B 3/02 |
| WO | WO-2020027765 A1 | * | 2/2020 | B62B 3/008 |

* cited by examiner

EXPANDABLE DOLLY

CROSS-REFERENCE TO RELATED APPLICATIONS

None.

FIELD OF THE DISCLOSURE

The present invention relates to a dolly, and more specifically, to a dolly that can be variably sized to lift small or large objects.

BACKGROUND OF THE INVENTION

A dolly is often used to transport objects from one place to another. The dolly is also termed as a "four-wheel dolly" or "caster board". The dolly includes a platform with wheels. The objects are placed over the platform and the dolly is transported from one place to another. The objects include, but not limited to, goods/products, cargo, containers, appliances, furniture, etc. The dolly comes in a different shape and size depending on the type of objects that need to be transported.

The existing dollies come in different shapes/designs and sizes and are configured to fit a particular sized objects. As such, the existing dollies cannot be used for transporting the objects with varied shapes and sizes. Use of several dollies takes up space in a warehouse or cargo area. Further, use of several dollies increases the overall cost of transporting the objects.

Some dollies are adjustable, such as U.S. Pat. No. 6,715,979 to Theising et al., U.S. Pat. No. 5,876,173 to English, and U.S. Pat. Pub. No. US20080056871A1 to Morgan et al., the contents of each are incorporated by reference in their entireties, for all purposes.

Therefore, there remains a continuing need for an improved dolly that can be extended to fit the objects of different sizes and transport the objects from one location to another.

BRIEF SUMMARY OF THE PRESENT INVENTION

It is an object of the present invention to provide an improved dolly that extends from small size to large size and that avoids the drawbacks of known art.

It is another object of the present invention to provide a dolly that extends from small size to large size, making it possible for one dolly to take the place of two or more conventional dollies.

In one aspect of the present invention, the invention provides a dolly that is expandable and capable of raising and transporting small or large objects. The dolly includes a pair of frames facing each other. The dolly includes a platform positioned over each of the frames. The dolly includes a bar receiving section extending from each of the frames. The bar receiving section includes a first hole at its distal end. The dolly includes an elongated bar comprising second holes. The dolly includes pins. The elongated bar inserts through the bar receiving sections such that the second holes align with the first holes in the bar receiving sections and adjust the distance between the frames. The pins insert through the first holes and the second holes and lock the length of the elongated bar i.e., distance between the frames. The platforms receive an object for transportation. Here, the objects include, but not limited to, goods/products, cargo, containers, appliances, furniture, etc.

The frames include wheels for transporting the dolly from one location to another. In addition, the frames include strap loops that receive straps. The straps wraparound the object placed above the platform and secure the object to the dolly. Further, the frames include hooks for connecting a cable to pull the dolly from one location to another. Furthermore, each of the frames include a post receiving section. The post receiving section receives a post e.g., a cylindrical pole or post. The post stabilizes the object placed over the platform. The post further includes arms. The arms extend from the second elongated bar facing the opposite frame. The arms go around the object and stabilize the object on the dolly.

In another aspect of the present invention, the invention provides a dolly that allows to lift a platform holding an object. The dolly includes a pair of frames facing each other. The dolly includes extended sections, each of the extended sections connecting perpendicularly to the frame. The dolly includes an extended bar connecting the extended sections. Each frame includes a platform, platform connecting rods connecting the platform, a support plate having gear teeth, and a shaft including first gears and a second gear. In one example, the platform comes in an L-shaped configuration. The first gears connect the platform connecting rods and the second gear connects the support plate. The dolly includes a crank assembly and a cable connecting the crank assembly and the support plates. The platforms receive an object such as goods/products, cargo, containers, appliances, furniture, etc. The crank assembly wraps the cable, thereby pulling the support plate of each of the pair of frames, closer together. The support plates turn the shaft which in turn engages the platform connecting rods. The platform connecting rods raise along with the platform holding the object.

Further, the crank assembly includes a cable wrapper. The cable wrapper wraps the cable and pulls the support plates closer. The crank assembly further includes a cable tensioner that helps to extend or contract the length of the cable. The frames and the extended sections comprise wheels for transporting the dolly from one location to another.

In one advantageous feature of the present invention, the dolly extends from small size to large size, making it possible for the dolly to take the place of two or more conventional dollies. The dolly has the ability to tie down the object with the help of the straps. This ensures the object does not slip and falls from the dolly. Further, the dolly provides the user stability and security during its use.

In another advantageous feature of the present invention, the dolly includes posts that help to stabilize the object over the platform and pull the dolly from one location to another. The dolly is easy to disassemble and can be stored easily. Once disassembled, it is easier to store away the dolly in a small place.

Features and advantages of the subject matter hereof will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

DETAILED DESCRIPTION OF EMBODIMENTS

Figure 1:
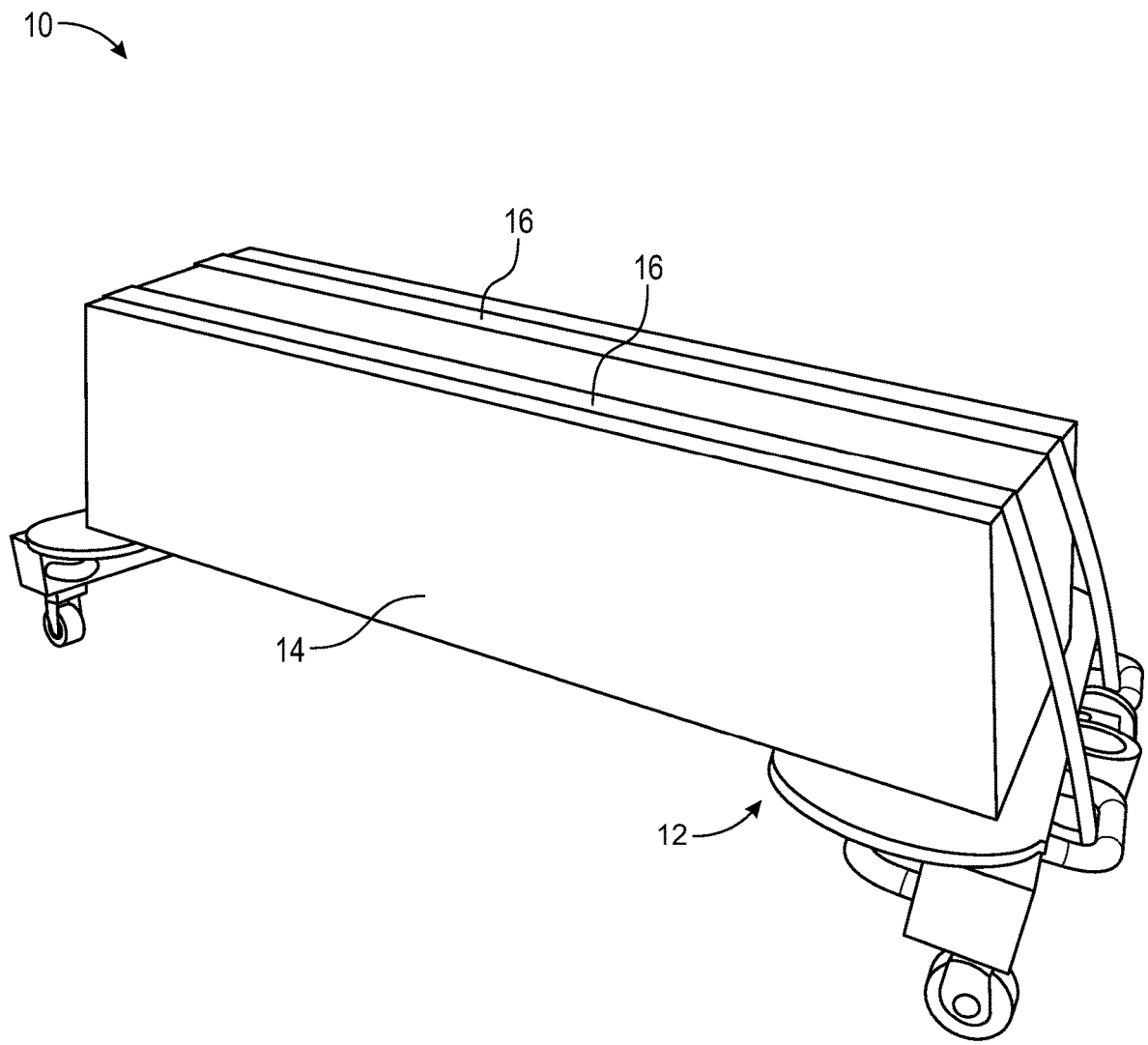
FIG. 1 illustrates an environment in which a dolly implements, in accordance with one exemplary embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

Turning to the Figures, FIG. 1 shows an environment 10 in which a dolly 12 implements, in accordance with one exemplary embodiment of the present invention. Dolly 12 receives an object 14 and helps to transport object 14 from one location to another. In the present embodiment, object 14 positions over dolly 12 and is tied to dolly 12 using straps 16. In one example, object 14 include, but not limited to, such as product, cargo, container, appliance, packaging box, furniture, etc.

Figure 2A:
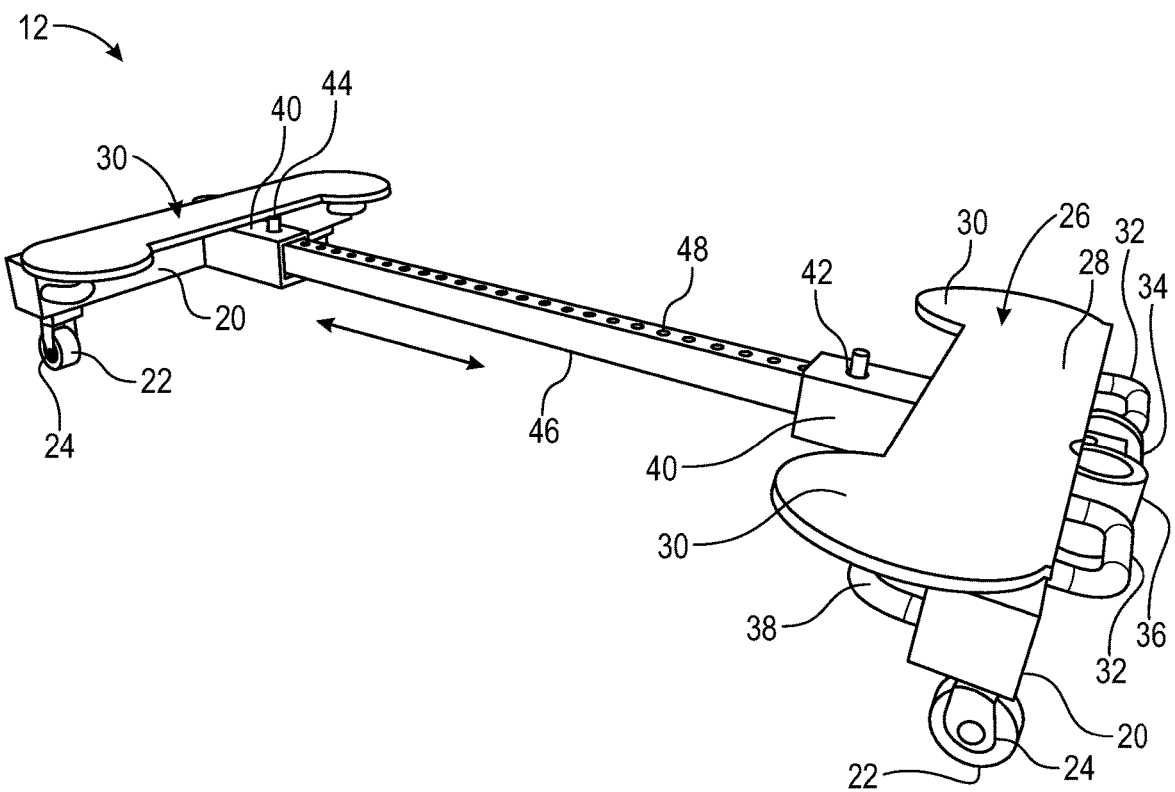
FIGS. 2A and 2B illustrate a side perspective view and a bottom side perspective view, respectively of the dolly in expanded position.
Figure 2B:
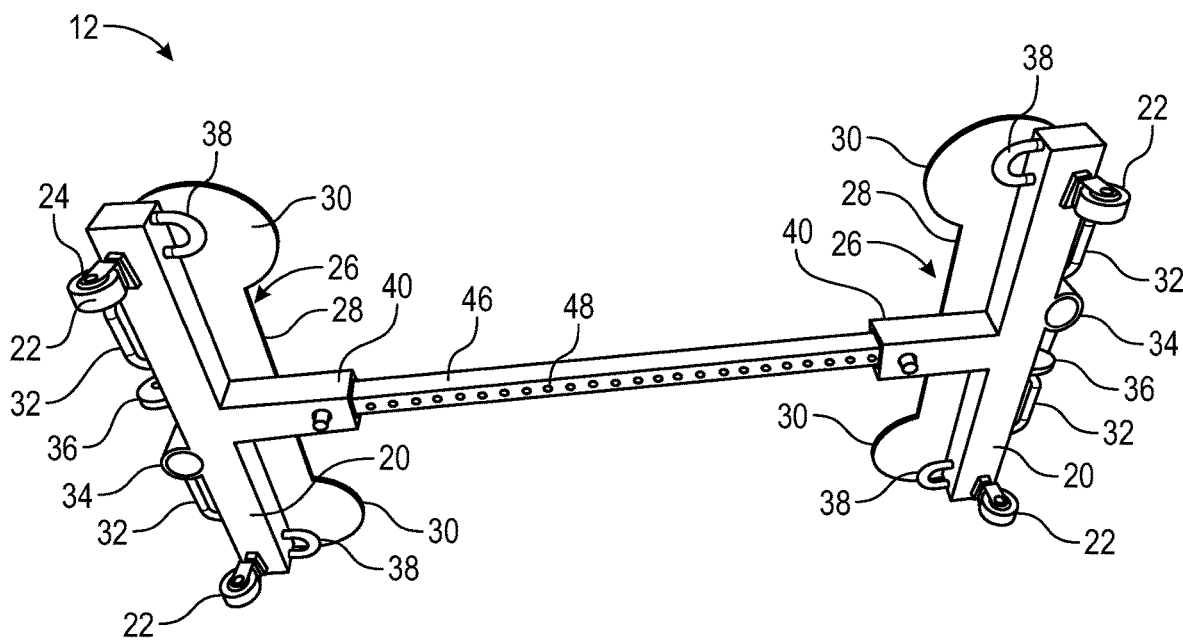

FIGS. 2A and 2B show a side perspective view and a bottom side perspective view, respectively of dolly 12, in accordance with one embodiment of the present invention. Dolly 12 includes a pair of frames 20 that position opposite each other. As can be seen from at least FIG. 2A, frames 20 position at a distance from one another. In one example, each frame 20 comes in a rectangular configuration. However, it is possible to provide frame 20 in any other configuration. Frame 20 provides a material made of metal, hard plastic, wood or any other suitable material. Frame 20 includes wheels 22 connected via casters 24. Each frame 20 presents platform 26. Platform 26 comes in a flat configuration and is made of metal, hard plastic, wood or any other suitable material. In one example, platform 26 presents rectangular section 28 and semi-circular sections 30 that extend from rectangular section 28. In another example, platform 26 comes in an L-shaped configuration or any other configuration depending on the need.

Frame 20 includes strap receiving sections or strap loops 32 at the outer side. Each strap receiving sections 32 comes in a U-shaped (i.e., U-shaped hook) configuration. Strap receiving sections 32 mount at both ends of frame 20. Strap receiving sections 32 receive straps 16 and help to strap, wrap around, or connect object 14 to dolly 12, as shown in FIG. 1. Frame 20 encompasses post receiving section 34. Post receiving section 34 mount at substantially center of frame 20. Post receiving section 34 receives a post (not shown) that helps to position object 14 over platform 26, the post is positioned adjacent to the object and stabilizes the object placed over the platform 26. Frame 20 further encompasses first hook 36. First hook 36 mounts at substantially center and outside of frame 20. Hook 36 receives a rope or cable (not shown). A user holds the cable and pulls the cable to transport dolly 12 from location to another. Further, frame 20 encompasses second hooks or inner hooks 38. Second hooks 38 mount at the inner side of frame 20 underneath platform 26 facing the other opposite frame 20. Second hooks 38 help to connect a cable and bring frames 20 closer.

Figure 3:
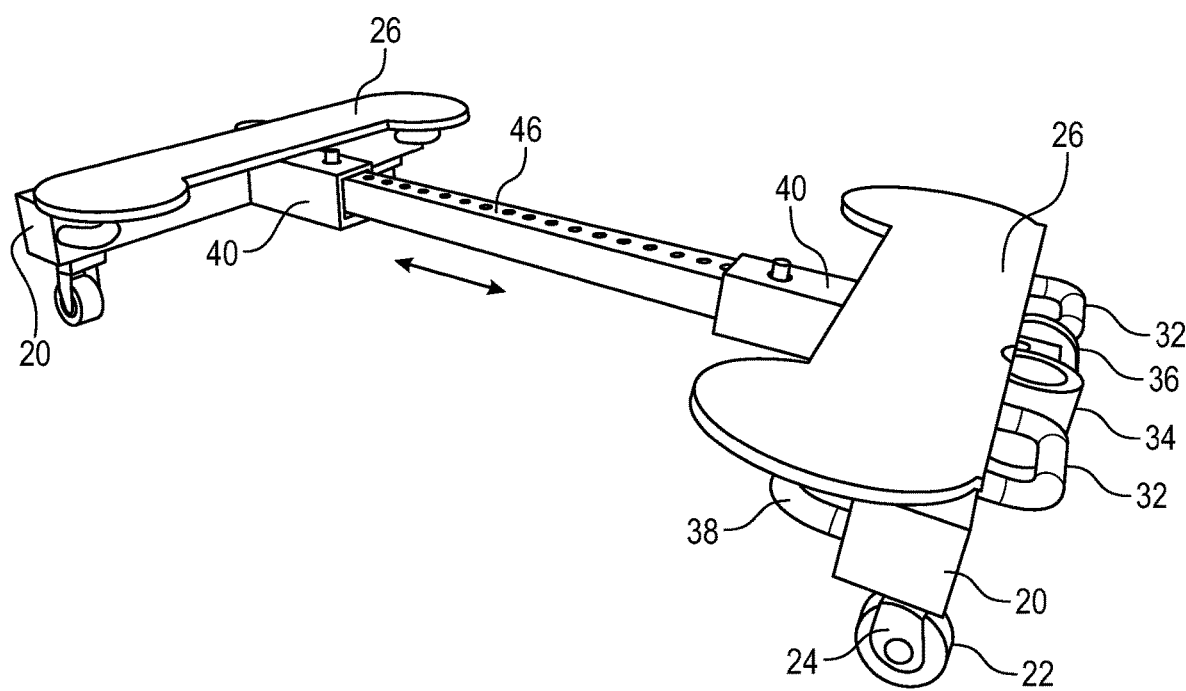
FIG. 3 illustrates the dolly in a contracted position.

Each frame 20 further includes bar receiving section 40. Bar receiving section 40 extends perpendicularly from frame 20. Bar receiving section 40 includes pin receiving section or hole 42 at its distal end. Pin receiving section 42 (or first hole, or first holes on each of the receiving section) receives pin 44 and helps to connect elongated bar 46 to frame 40 at bar receiving section 40. Here, elongated bar 46 draws through bar receiving sections 40 as shown in FIGS. 2A and 2B. In one example, elongated bar 46 encompasses holes 48. The user adjusts the length of elongated bar 46 by drawing elongated bar 46 through bar receiving sections 40 and inserts pins 44 through pin receiving sections 42, as shown in FIG. 3. Inserting pins 44 ensure the length of elongated bar 46 (or distance between frames 20) gets locked. A person skilled in the art understands that the length of elongated bar 46 is adjusted depending on the length/size of object 14 that needs to be transported. Upon locking, the user places object 14 over platform 26. Further, the user connects the cable to first hook 36 and pulls dolly 12 for transporting object 14 from one place to another.

Figure 4A:
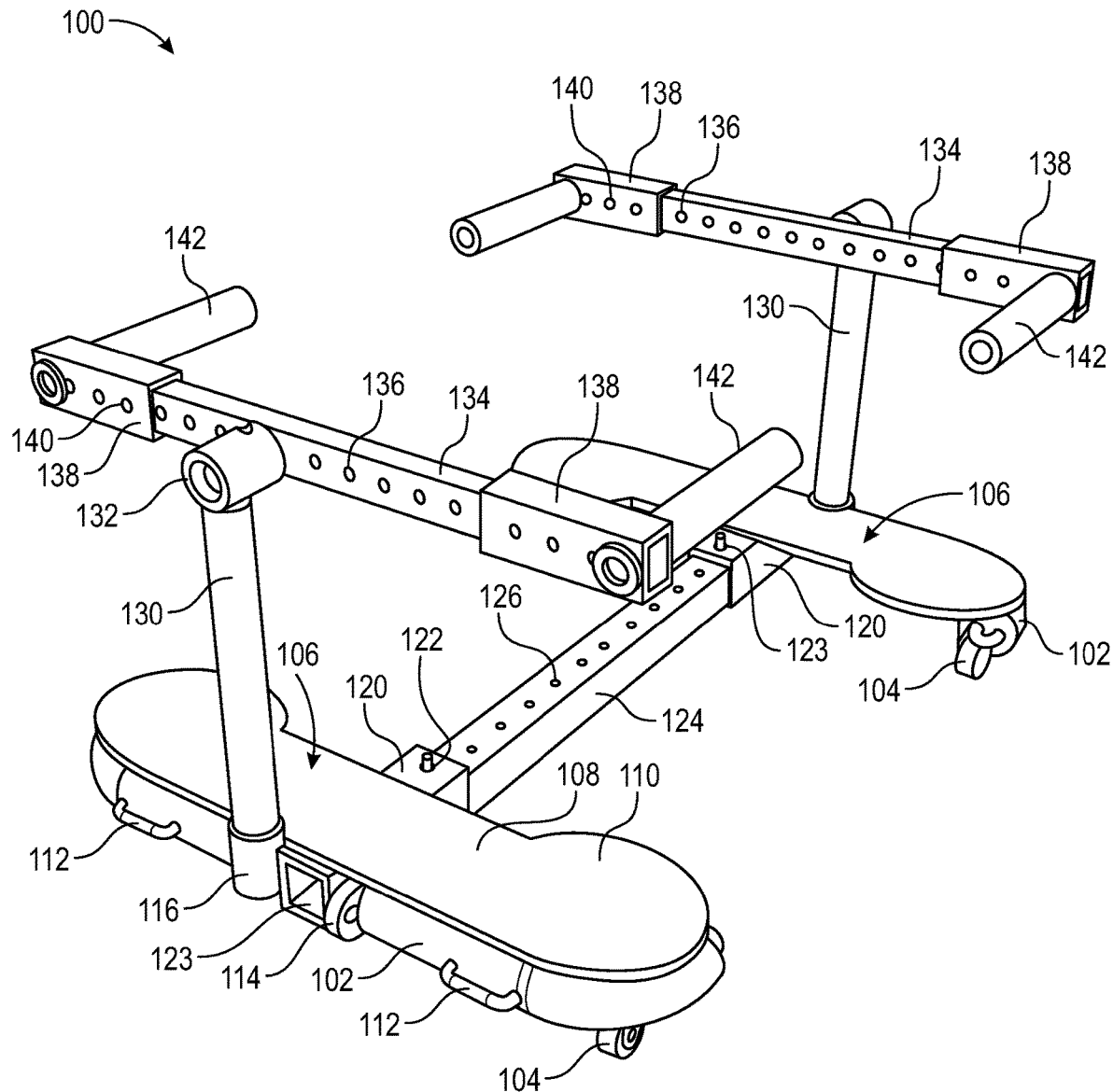
FIGS. 4A and 4B illustrate a side perspective view and a bottom side perspective view, respectively of a dolly, in accordance with another embodiment of the present invention.
Figure 4B:
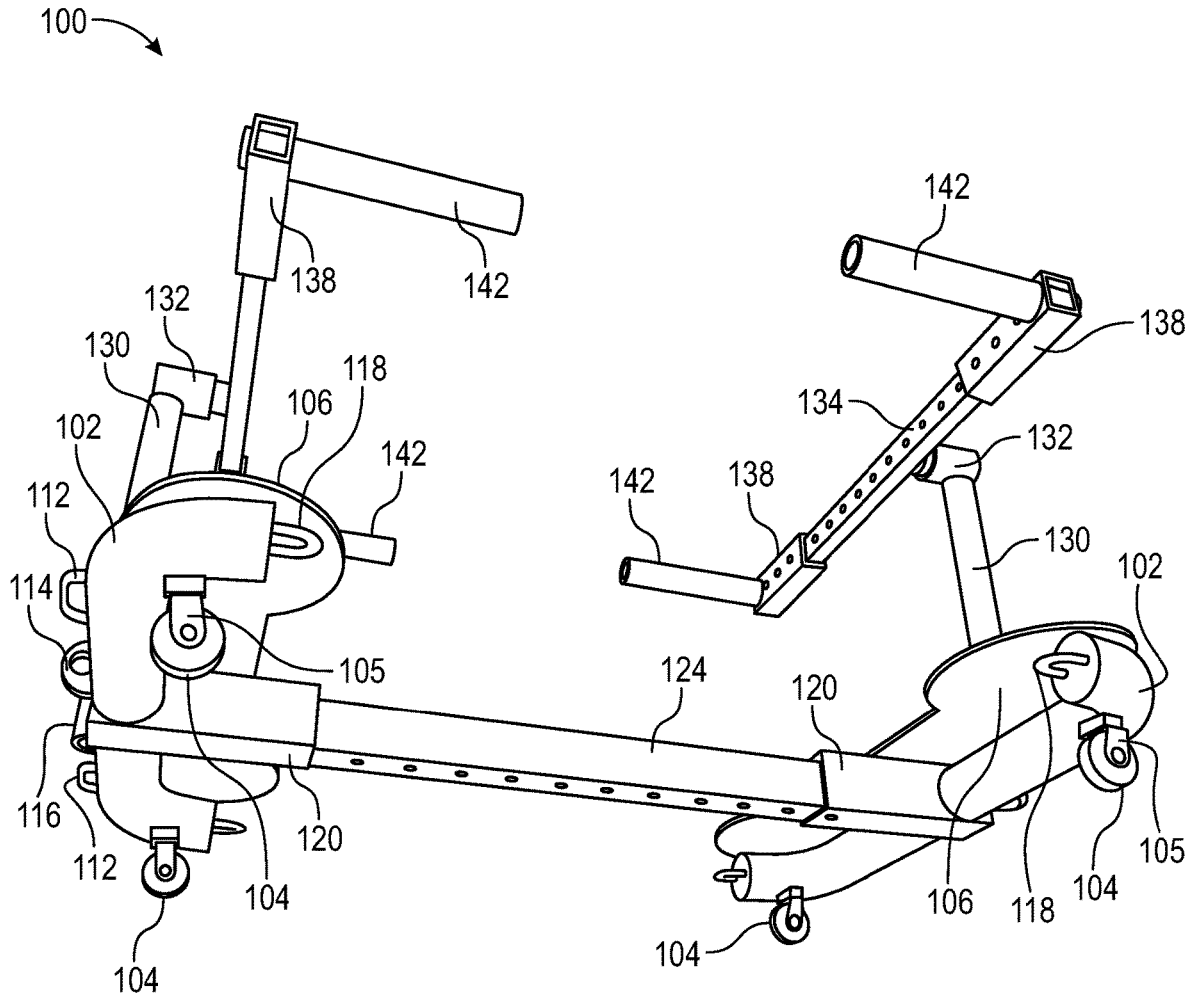

FIGS. 4A and 4B show a side perspective view and a bottom side perspective view, respectively of dolly 100, in accordance with another embodiment of the present invention. Dolly 100 includes a pair of frames 102 that position opposite each other. In one example, each frame 102 comes in a U-shaped configuration. However, it is possible to provide frame 102 in any other configuration such as rectangular configuration, for example. Frame 102 provides a material made of metal, hard plastic, wood or any other suitable material. Frame 102 includes wheels 104 connected via casters 105. Each frame 102 presents platform 106. Platform 106 comes in a flat configuration and is made of metal, hard plastic, wood or any other suitable material. Platform 106 presents rectangular section 108 and semicircular sections 110 that extend from rectangular section 108.

Frame 102 includes strap receiving sections or strap loops 112 at the outer side. Each strap receiving sections 112 comes in a U-shaped (i.e., U-shaped hook) configuration. Strap receiving sections 112 mount at both ends of frame 102. Strap receiving sections 112 receive straps (not shown, similar to straps 16 in FIG. 1) and help to strap or connect objects to dolly 100 (as shown in FIG. 1, for example). Frame 102 further encompasses first hook 114. First hook 114 mounts at substantially center and outside of frame 102. First hook 114 receives a rope or cable (not shown). A user holds the cable and pulls the cable to transport dolly 100 from location to another. Further, frame 102 includes post receiving section 116. Post receiving section 116 comes in a cylindrical configuration and connects to frame 102 at substantially center of frame 102. Frame 102 encompasses second hooks 118. Second hooks 118 mount at the inner side of frame 102 facing the other opposite frame 102. Second hooks 118 help to connect a cable and bring frames 102 closer.

Each frame 102 includes bar receiving section 120. Bar receiving section 120 extends perpendicularly from frame 102. Bar receiving section 120 includes pin receiving section or hole 122 at its distal end. Pin receiving section 122 receives pin 123 and helps to connect first elongated bar 124 to frame 102 at bar receiving section 120. Here, first elongated bar 124 draws through hole 123 at bar receiving sections 120, as shown in FIG. 4A. In one example, first elongated bar 124 encompasses holes 126. The user adjusts the length of first elongated bar 124 by drawing first elongated bar 124 through bar receiving sections 120 and inserts pins 123 through pin receiving sections 122, as shown in FIG. 4A. Inserting pins 123 ensure the length of elongated bar 120 gets locked. Upon locking, the user places an object over platform 106. Further, the user connects the cable to first hook 114 and pulls dolly 100 for transporting the object from one place to another.

In the present embodiment, each frame 102 provides post 130. Post 130 indicates a cylindrical tube or pole made of metal, hard plastic, wood or any other suitable material. Post 130 that extends from frame 102. Here, post 130 inserts in post receiving section 116 and extends upwards from frame 102, as shown in FIG. 4A. Post 130 presents post connector 132. Post connector 132 helps to connect post 130 to second elongated bar 124. Second elongated bar 134 positions parallel to and at a height from platform 106. Second elongated bar 134 includes holes 136 for connecting arm brackets 138 at both ends. Each arm bracket 138 includes holes 140 that help to insert pins (not shown) for adjusting the length of second elongated bar 124. Each arm bracket 138 includes arm 142. Arm 142 extends perpendicularly from arm bracket 138. Arms 142 at the end of arm bracket 138 face the arms 142 at the opposite side.

In accordance with the present embodiment, platform 106 receives the object over it. Further, the user adjusts the length of first elongated bar 124 depending on the length/size of the object. In other words, first elongated bar 124 extends matching the size of the object on dolly 100. Further, the user adjusts the length of second elongated bars 124 (to match the size of the object) such that arms 142 go around the object i.e., at the corners of the object. Here, arms 142 position around the object and ensure the object is held firmly over platform 106 without it being moved. In other words, arms 142 position around the object and stabilizes the object on dolly 100. A person skilled in the art understands that post 130 acts as a stabilizer and together with arms 142 holds the object on four ends to stabilize the top portion of the object such as a stand-up piano, for example. As such, post 130 with arms 142 provide additional safety and stability while holding and transporting the object. Arms 142 adjust in length to become close or far from each other, holding and claiming the object of any size and shape. In one embodiment, arms 142 tilt in any direction from up to bottom to left to right. This ensures arms 142 capability in holding the object of any shape, say furniture, for example. The user can tilt arms at an angle and fit the object through narrow spaces such as a doorway, for example.

Figure 5A:
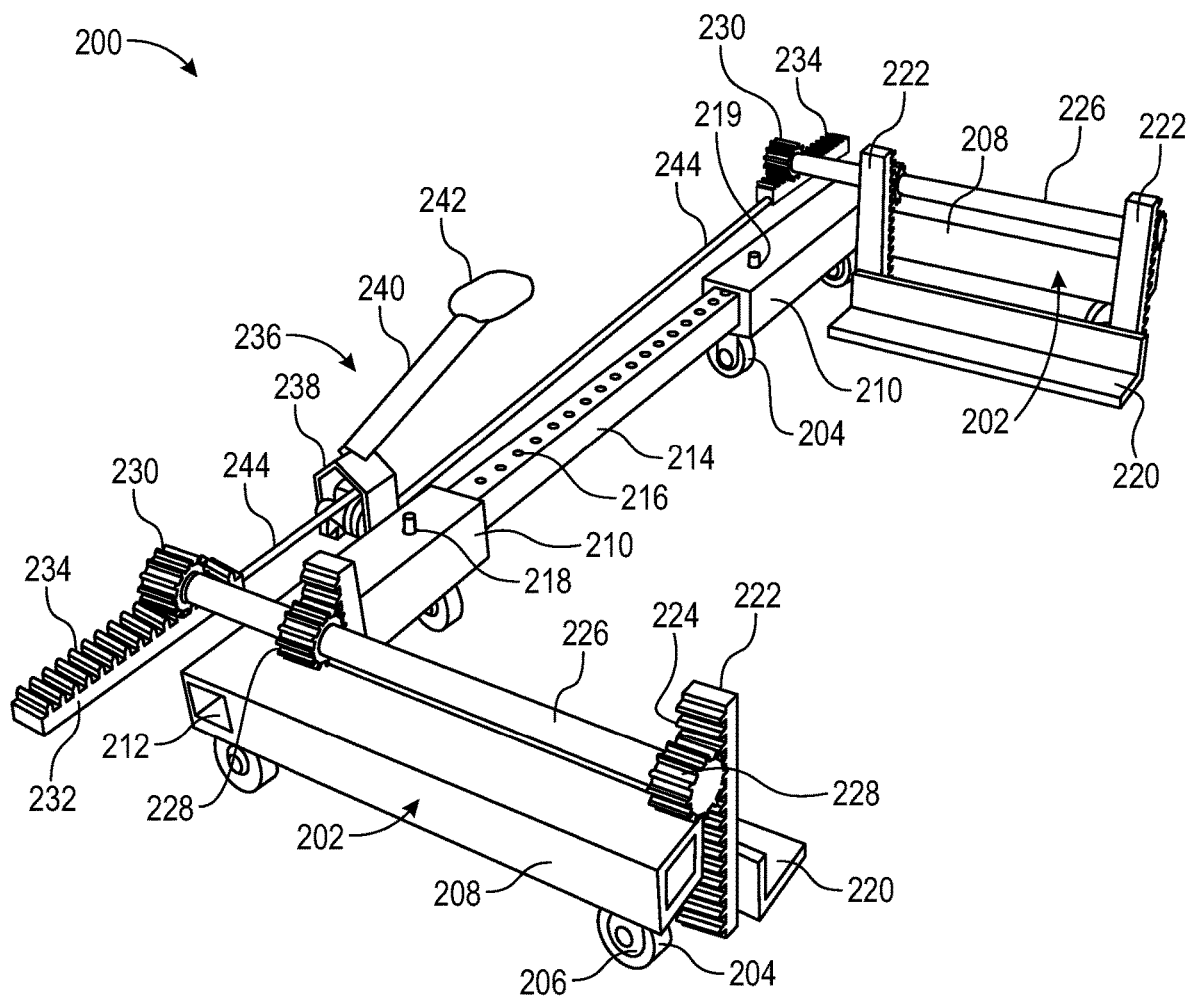
FIGS. 5A and 5B illustrate side perspective views of a dolly, in accordance with another embodiment of the present invention.
Figure 5B:
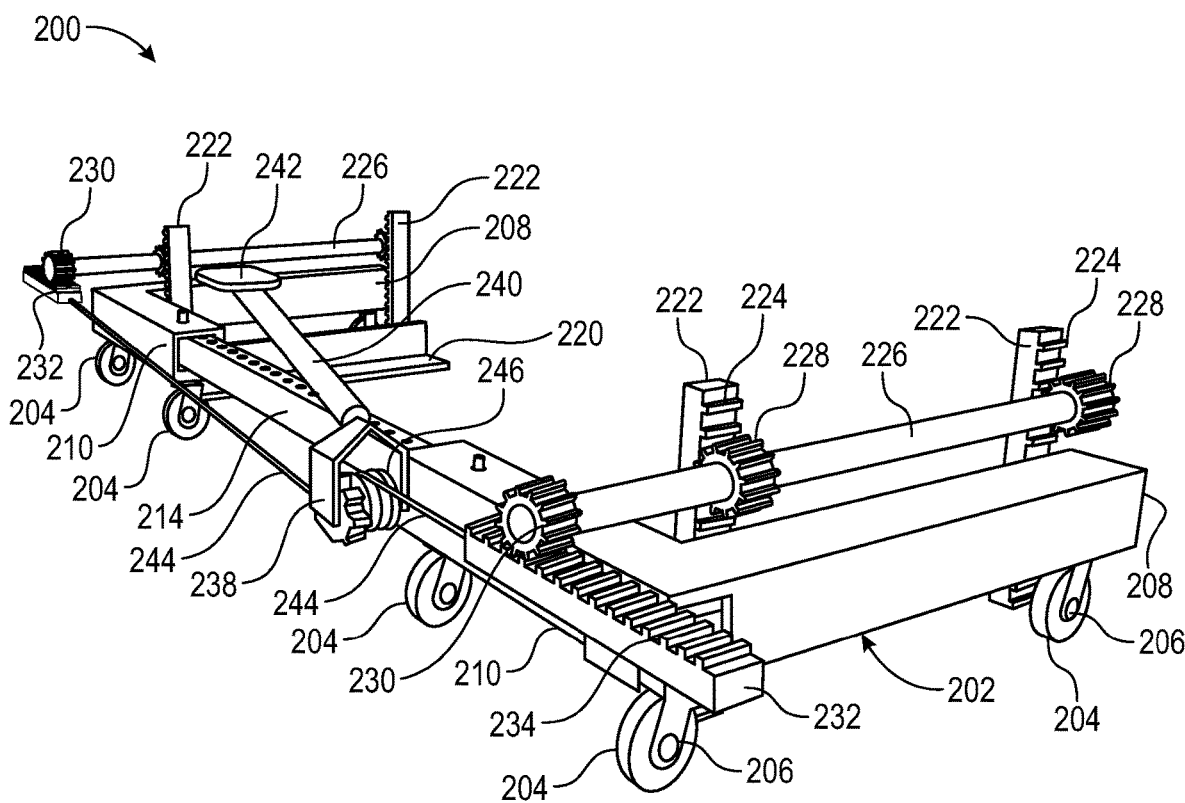

FIGS. 5A and 5B show side perspective views of dolly 200, in accordance with another embodiment of the present invention. Dolly 200 includes a pair of frames 202 that position opposite to each other. Each frame 202 presents wheels 204 that connect via casters 206. Frame 202 provides a material made of metal, plastic, wood or any other suitable material. Frame 202 comes in an L-shape configuration. As such, frame 202 presents first section 208 and second section 210. Second section 210 mounts perpendicularly to first section 208. In one example, second section 210 encompasses bar receiving section or hole 212. Bar receiving section 212 receives elongated bar 214. Elongated bar 214 indicates an extending member that inserts through bar receiving section 212 and allows to adjust the gap between frames 202 depending on the shape and size of an object to be transported. Elongated bar 214 includes holes 216 that align with holes 218 at the end of second section 210. In one example, pins 219 insert through holes 216 and 218 and lock the length of extending bar 214 and/or the distance between frames 202 i.e., (first sections 208).

Further, dolly 200 includes platform 220. In one example, platform 220 comes in a flat configuration. In another example, platform 220 comes in an L-shaped configuration. Platform 220 connects to platform connecting rods or elongated racks 222. Platform connecting rods 222 extend from the rear of platform 220. At the opposite side, each platform connecting rod 222 encompasses first gear teeth 224. First gear teeth 224 connect to shaft 226. Shaft 226 extends over the length of first section 208 and beyond. In the present embodiment, shaft 226 encompasses first gears 228. First gears 228 engage first gear teeth 224 at platform connecting rods 222. Further, shaft 226 encompasses second gear 230 that positions at distal end of shaft 226. Dolly 200 further includes support section 232 having second gear teeth 234.

Dolly 200 further includes crank assembly or ratcheting tool assembly 236. Crank assembly 236 includes bracket 238. Bracket 238 encompasses extending rod 240. Extending rod 240 extends from bracket 238 and includes actuator or pedal 242 at its distal end. Actuator 242 presents a flat surface and allows the user to place his leg or hand to operate crank assembly 236. Crank assembly 236 further includes cable 244 connecting support plates 232. Here, cable 244 connects via cable wrapper 246 positioned in bracket 238. In operation, pressing or actuating actuator 242 engages cable wrapper 246, which in turn pulls and wraps cable 244 around it. Wrapping of cable 244 results in pulling support plates 232 closer which result in engaging second gears 228. As second gears 228 rotate, shafts 226 connecting second gears 228 also rotate. Rotation of shafts 226 results in rotation of first gears 224. As first gears 224 rotate, platform connecting rods 222 are raised. As specified above, platform 220 connects to platform connecting rods 222. As platform connecting rods 222 raise, platforms 220 also raise and results in lifting of the object placed over platforms 220.

Figure 6:
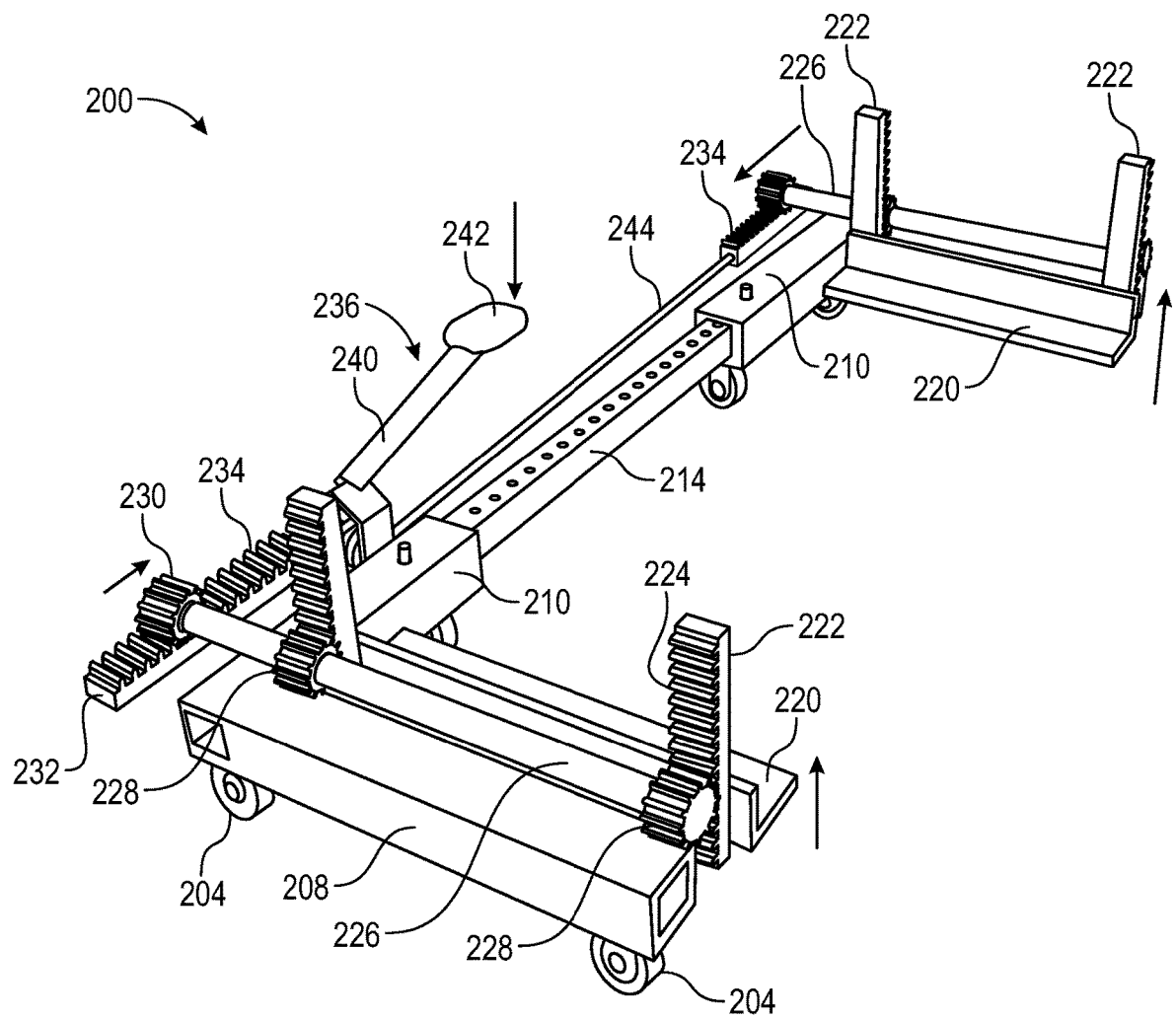
FIG. 6 illustrates a side perspective view the dolly in which a platform is raised.

In accordance with the present embodiment, platforms 220 receives an object to be transported. The user adjusts the length of elongated bar 214 depending on the length and/or size of the object. After placing the object, the user operates actuator 242. Upon actuating, cable 244 engages support plates 232 which in turn engages platforms 220 via second gears 228, shafts 226, first gears 224 and platform connecting rods 222 as explained above. As the user applies pressure on actuator 242, platforms 220 raise upwards as shown in FIG. 6. When the object is placed over platforms 220, the object also raises. In order to lower platform 220, pressure on cable 244 is released, which allows support plates 232 to extend and operate second gears 228 and first gears 224 to turn in opposite direction and lower platforms 220, as shown in FIG. 5A, for example.

Dolly 200 helps to load or unload the object that is being transported. The user can operate the crank assembly 236 to raise or lower the height of platform 220 from ground or any surface where dolly 200 is placed. For example, the user can place the object(s) over the platforms. Subsequently, the user may transport the object, raise the platform and unload some of the objects. Further, the user may transport dolly 200 to another location and raise platform 220 and unload the remaining objects.

Figure 7A:
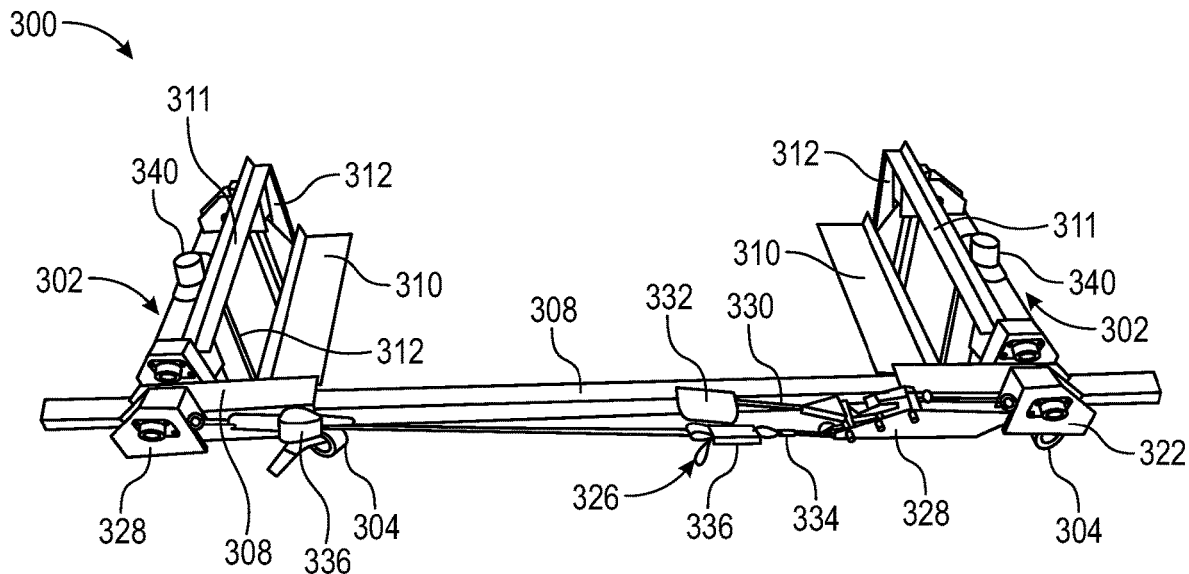
FIGS. 7A and 7B illustrate a front perspective view and a side perspective view, respectively of a dolly, in accordance with another embodiment of the present invention.
Figure 7B:
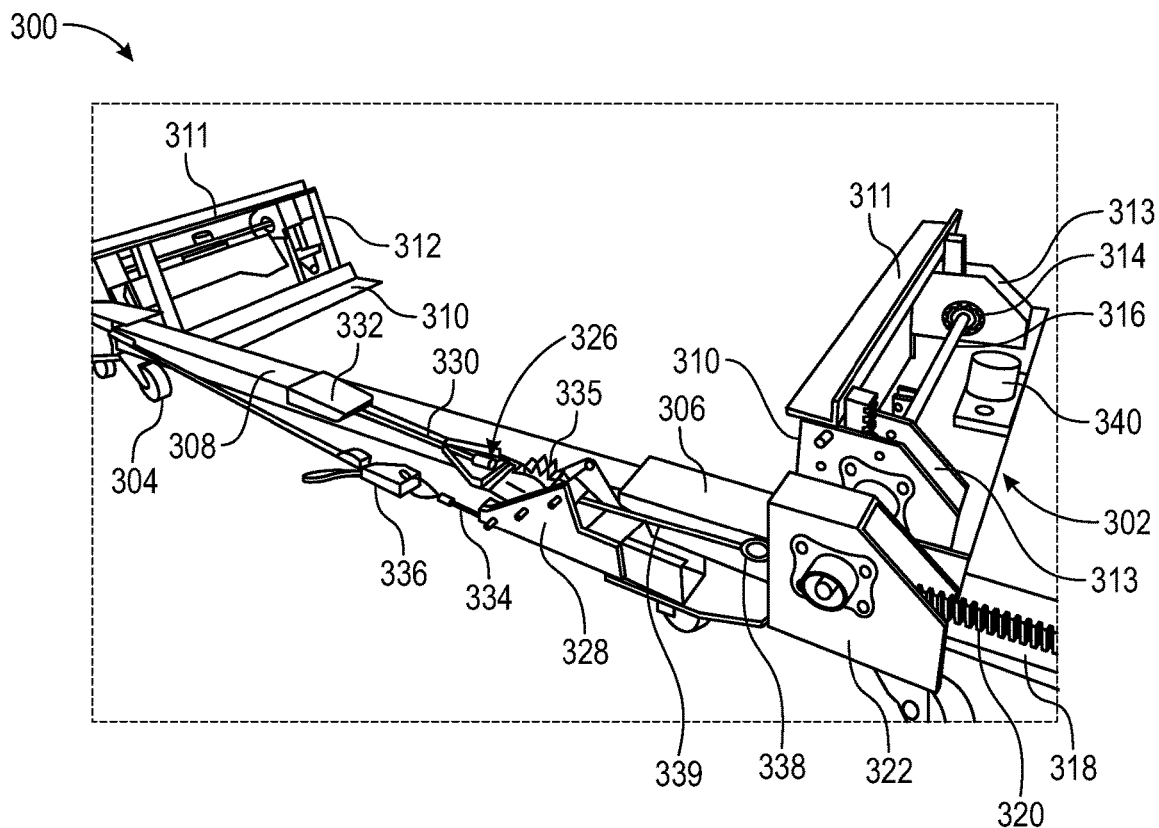

FIGS. 7A and 7B show a front perspective view and a side perspective view, respectively of dolly 300, in accordance with yet another embodiment of the present invention. Dolly 300 includes a pair of frames 302 say a first frame and a second frame that position opposite to each other. Each frame 302 presents wheels 304 that connect via casters 305. Frame 302 provides a material made of metal, plastic, wood or any other suitable material. Frame 302 presents extended section 306 that receives an elongated bar 308. It should be understood that frame 302 and extended section 306 come as a single component. Extended sections 306 receive elongated bar 308. Here, elongated bar 308 indicates an extending member that allows to adjust the gap between frames 302 depending on the shape and size/length of an object to be transported.

Figure 8:
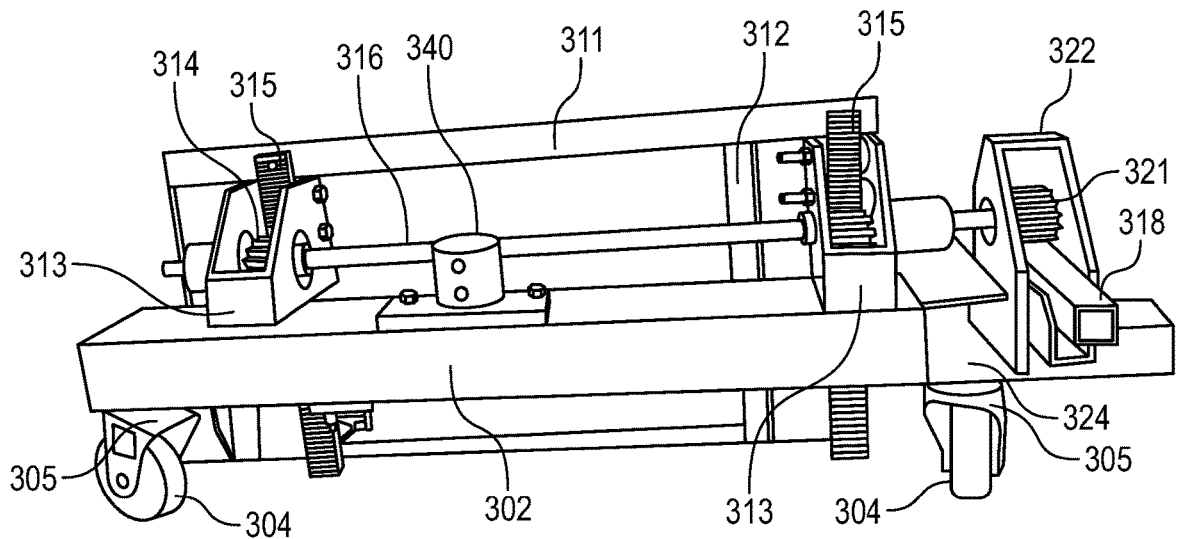
FIGS. 8 and 9 illustrate a rear and a front view of a frame, in accordance with one embodiment of the present invention.

Further, dolly 300 includes platforms 310. In one example, each platform 310 comes in a flat configuration i.e., parallel to surface such as ground. In another example, platform 310 comes in an L-shaped configuration. Platform 310 connects to platform connecting rods or elongated racks 312. Platform connecting rods 312 extend from the rear of platform 310. In one example, platform connecting rods 312 encompasses top plate 311 that mounts parallel to platform 310. Platform connecting rods 312 connect to first housing 313. FIG. 8 shows the feature of frame 302 having first housing 313, in accordance with one embodiment of the present invention. First housing 313 encompasses first gears 314 that connect first gear teeth 315 at the rear of platform connecting rods 312. Further, first gear teeth 314 connect to shaft 316 via first gears 314. Here, shaft 316 extends over the length of frame 302 and beyond. In the present embodiment, shaft 316 includes first gears 314 (one at proximal end and another at substantially center) and second gear 321 at its distal end. In one example, dolly 300 presents support plates 318 having second gear teeth 320. Support plates 318 and second gear 321 encompass in second housing 322. In one example, extended section 306 presents opening 324 for receiving elongated bar 308. Elongated bar 308 includes holes (not shown, similar to holes 216 in FIG. 5A, for example) to adjust and lock the length of elongated bar 308 and the distance between frames 302.

Figure 9:
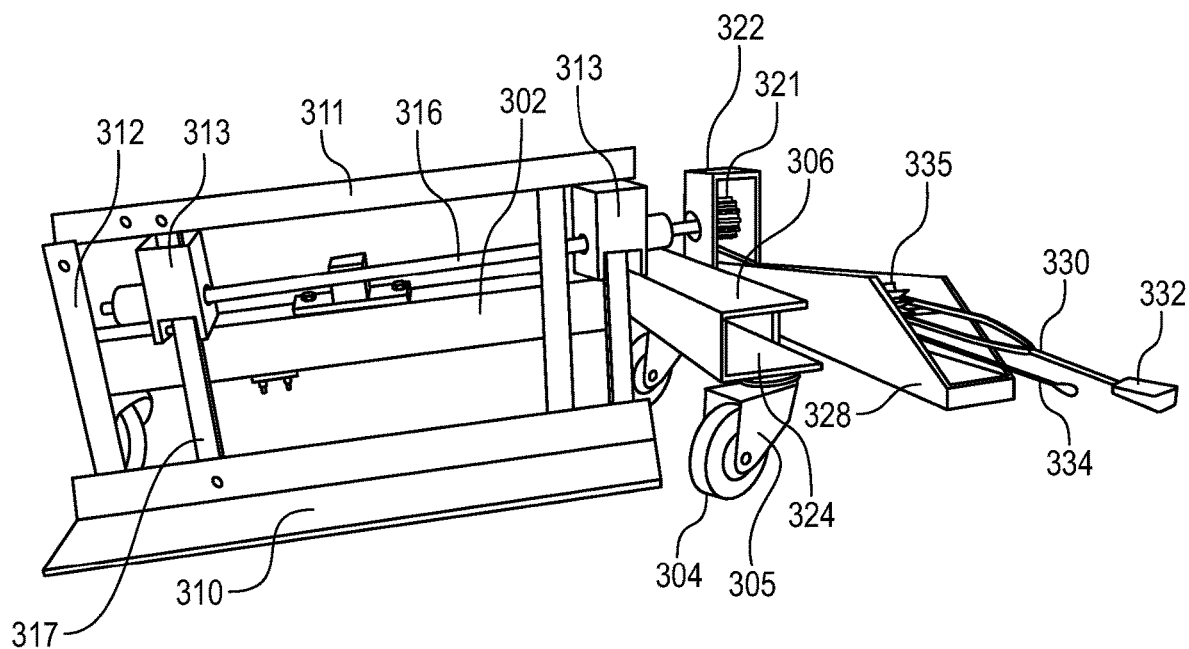

Referring to FIGS. 7A, 7B and 9, dolly 300 further includes crank assembly or ratcheting tool assembly 326 (similar to crank assembly 336 in FIG. 5A). Crank assembly 326 connects to one of frames 302 at extended section 306. Crank assembly 326 includes bracket 328 that connects to extended section 306. Bracket 328 encompasses extending rod 330. Extending rod 330 extends from bracket 328 and includes actuator 332 at its distal end. Actuator 332 presents a flat surface (and acts as a pedal) and allows the user to place his leg or hand to operate crank assembly 326. Crank assembly 326 further includes cable connector 334 that connects to cable tensioner 336. In one example, one or more extending members 336 are used. Cable tensioner 336 help to connect cable 339 to crank assembly 326 and support plates 318. Further, cable tensioner 336 extends and allows to increase the length of elongated bar 308. In one example, cable 339 connects to support plates 318 via connecting member or hook 338, as shown in FIG. 7B. In the present embodiment, cable 339 connects via cable wrapper or gear member 335 positioned in bracket 328. In operation, pressing or actuating actuator 332 engages cable wrapper 335, which in turn pulls and wraps cable 339 around it. Wrapping of cable 339 results in pulling support plates 318 closer which results in engaging second gears 321. As second gears 321 rotate, shafts 316 connecting second gears 321 also rotate. Rotation of shaft 316 results in rotation of first gears 314. As first gears 314 rotate, platform connecting rods 312 are raised along with platforms 310. As shown in FIG. 7A, the platforms are in their lowered positioned, but when cranked with crank assembly 326, the platforms 310 is raised up, as shown in FIG. 7B (showing only right side raised up, although in practice, a more common scenario is that both of the platforms 310, one on each of the frames 302, would rise up together to lift an object symmetrically.

Dolly 300 operates similar to dolly 200. For instance, platform 310 receives an object to be transported. The user adjusts the length of elongated bar 308 depending on the length and/or size of the object. After placing the object, the user operates actuator 332. Upon actuating, cable 339 engages support sections 318 which in turn engages platform 310 via second gears 321, shafts 316, first gears 314 and platform connecting rods 312 as explained above. As the user applies pressure on actuator 332, platform 310 raises from the ground. When the object is placed over platform 310, the object also raises. In order to lower platform 310, pressure on cable 339 or cable tensioner 336 is released, which allows support plates 318 to extend and operates second gears 321 and first gears 314 top turn in opposite direction and lower platform 310.

In one implementation, each frame 302 includes post receiving section 340. Post receiving section 340 configures to receive a post (not shown, similar to post 130 in FIG. 4A, for example). The post includes arms (not shown, similar to arms 142) that go around the object and stabilizes the object on dolly 300, as explained above.

In one exemplary embodiment, dolly 300 includes an overhead rack (not shown). The overhead rack is a two side and one top rod that mounts on each side of dolly 300, creating a clothes rack. The overhead rack is used to hang items on, such as painting, tools or any other objects.

The embodiments provide for several advantages over the prior art. For example, the presently disclosed dolly extends from small size to large size, making it possible for the dolly to take the place of two conventional dollies. The dolly has the ability to tie down the object. This ensures the object does not slip and falls from the dolly and provides the user stability and security during its use. Further, the dolly includes posts that help to stabilize the object over the platform and pull the dolly from one location to another. The dolly is easy to disassemble and can be stored easily. Once disassembled, it is easier to store away the dolly in a small place. Further, the dolly can be easily assembled or disassembled without the need for tools, which makes it convenience and reliability.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

I claim:

1. A dolly, comprising:
   a pair of frames facing each other, wherein each frame of said pair of frames comprises:
   a platform;
   at least one platform connecting rod connecting said platform;
   a support plate having gear teeth;
   a shaft comprising first gears and a second gear, wherein said first gears connect said at least one platform connecting rod and said second gear connects said support plate at said gear teeth;
   a plurality of extended sections, each of said plurality of extended sections connecting perpendicularly to a frame of said pair of frames;
   an elongated bar connecting said extended sections;
   a crank assembly connecting a frame of said pair of frames; and,
   a cable connecting said crank assembly and said support plate of each of the pair of frames,
   wherein said platform receives an object, wherein said crank assembly engages wrapping said cable and pulling said support plate of each frame of said pair of frames closer, wherein said support plate of each of the pair of frames turns said shaft, which in turn engages said at least one platform connecting rod, and wherein said at least one platform connecting rod raises said platform and said object.

2. The dolly of claim 1, wherein said platform is L-shaped.

3. The dolly of claim 1, wherein said crank assembly comprises a cable wrapper, and wherein said cable wrapper wraps said cable, thereby pulling said support plate of each of the pair of frames, closer.

4. The dolly of claim 1, wherein said crank assembly comprises an extending rod connecting a pedal, and wherein said pedal engages and wraps said cable, thereby pulling said support plate of each of said pair of frames, closer together.

5. The dolly of claim 1, wherein each of said frames and said plurality of extended sections comprise wheels for transporting said dolly from one location to another.

6. The dolly of claim 1, wherein each of said frames comprises strap loops, and wherein said strap loops receive straps that wrap around said object and secure said object to said dolly.

7. The dolly of claim 1, wherein each of said frames comprises a hook to pull said dolly from one location to another.

8. The dolly of claim 1, wherein each of said frames comprises a post receiving section, wherein said post receiving section receives a post, and wherein the post stabilizes said object placed over said platform.

9. The dolly of claim 8, wherein said post comprises a second elongated bar positioned in parallel to said platform, and wherein the second elongated bar stabilizes said object.

10. The dolly of claim 9, wherein said second elongated bar comprises arms, wherein said arms extend from said second elongated bar, and wherein said arms go around said object and stabilize said object on said dolly.

11. The dolly of claim 1, further comprises a cable tensioner, wherein said cable tensioner helps to extend or contract said cable.

12. The dolly of claim 11, wherein said crank assembly comprises a cable connector, and wherein the cable connector connects the cable and the cable tensioner.

* * * * *